US009507565B1

(12) United States Patent
Streicher et al.

(10) Patent No.: US 9,507,565 B1
(45) Date of Patent: Nov. 29, 2016

(54) PROGRAMMABLE DEVICE IMPLEMENTING FIXED AND FLOATING POINT FUNCTIONALITY IN A MIXED ARCHITECTURE

(71) Applicant: Altera Corporation, San Jose, CA (US)

(72) Inventors: Keone Streicher, San Ramon, CA (US); Martin Langhammer, Salisbury (GB); Yi-Wen Lin, Glendale, CA (US); Hyun Yi, San Jose, CA (US)

(73) Assignee: ALTERA CORPORATION, San Jose, CA (US)

( * ) Notice: Subject to any disclaimer, the term of this patent is extended or adjusted under 35 U.S.C. 154(b) by 338 days.

(21) Appl. No.: 14/180,664

(22) Filed: Feb. 14, 2014

(51) Int. Cl.
*G06F 7/483* (2006.01)
*G06F 7/499* (2006.01)
*G06F 7/485* (2006.01)
*G06F 7/487* (2006.01)

(52) U.S. Cl.
CPC .............. *G06F 7/485* (2013.01); *G06F 7/483* (2013.01); *G06F 7/4876* (2013.01); *G06F 7/499* (2013.01)

(58) Field of Classification Search
CPC .............................. G06F 7/485; G06F 7/4876
See application file for complete search history.

(56) References Cited

U.S. PATENT DOCUMENTS

| 6,334,135 B2 * | 12/2001 | Kabuo | 708/525 |
| 6,954,842 B2 * | 10/2005 | Drabenstott | G06F 9/30036 712/18 |
| 2002/0178204 A1 * | 11/2002 | Steele, Jr. | G06F 7/483 708/525 |
| 2006/0288070 A1 * | 12/2006 | Vadi | G06F 7/02 708/524 |
| 2012/0290819 A1 * | 11/2012 | Langhammer | G06F 7/483 712/222 |

\* cited by examiner

Primary Examiner — Chuong D Ngo (57) ABSTRACT

Configurable specialized processing blocks, such as DSP blocks, are described that implement fixed and floating-point functionality in a single mixed architecture on a programmable device. The described architecture reduces the need to construct floating-point functions outside the configurable specialized processing block, thereby minimizing hardware cost and area. The disclosed architecture also introduces pipelining into the DSP block in order to ensure the floating-point multiplication and addition functions remain in synchronicity, thereby increasing the maximum frequency at which the DSP block can operate. Moreover, the disclosed architecture includes logic circuitry to support floating-point exception handling.

21 Claims, 10 Drawing Sheets

PROGRAMMABLE DEVICE IMPLEMENTING FIXED AND FLOATING POINT FUNCTIONALITY IN A MIXED ARCHITECTURE

BACKGROUND OF THE DISCLOSURE

This disclosure relates to a programmable integrated circuit, and particularly to a configurable specialized processing block in a programmable integrated circuit device. More particularly, this disclosure relates to a specialized processing block, such as a digital signal processing block, that implements fixed and floating-point functionality in a mixed architecture on a programmable device—e.g., a field-programmable gate array (FPGA) or other programmable logic device (PLD).

It has become increasingly common to design PLDs to include configurable specialized processing blocks in addition to blocks of generic programmable logic resources. Such configurable specialized processing blocks may include a concentration of circuitry on a PLD that has been partly or fully hardwired to perform one or more specific tasks, such as a logical or a mathematical operation. A configurable specialized processing block may also contain one or more specialized structures, such as an array of configurable memory elements. Examples of structures that are commonly implemented in such configurable specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

These fixed-logic elements within the configurable specialized processing blocks are interconnected by a configurable interconnect structure within the configurable specialized processing block. They may also be able to accept parameters as well as data inputs. Thus, while the elements are fixed in the type of arithmetic or logical functions that they perform, their interconnection within the block is flexible under user control, and moreover, if an element accepts parameters, then the way in which it performs its fixed function may be subject to a degree of user control. In addition, it may be possible to route the outputs of some or all of the fixed-logic elements within a block either to another fixed-logic element within the block or directly out of the block.

One particularly useful type of configurable specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations. Each DSP block may include one or more multipliers, adders, and registers. In addition, each DSP block may include programmable connectors (e.g., multiplexers) that allow the various components of the block to be configured in different ways.

Typically, the arithmetic operators (adders and multipliers) in such configurable specialized processing blocks have been fixed-point operators. If floating-point operators were needed, the user would construct them outside the configurable specialized processing block using general-purpose programmable logic of the device, or using a combination of the fixed-point operators inside the configurable specialized processing block with additional logic in the general-purpose programmable logic.

SUMMARY OF THE DISCLOSURE

In accordance with embodiments of the present disclosure, configurable specialized processing blocks such as the DSP blocks described above are enhanced by including floating-point addition among the functions available in the DSP block. This reduces the need to construct floating-point functions outside the configurable specialized processing block. The addition function may be a wholly or partially dedicated (i.e., "hard logic") implementation of addition in accordance with the IEEE754-1985 standard, and can be used for addition operations, multiply-add (MADD) operations, or vector (dot product) operations, any of which can be either real or complex. The floating-point adder circuit may be incorporated into the DSP block, and can be independently accessed, or used in combination with a multiplier in the DSP block, or even multipliers in adjacent DSP blocks (referred to herein as "chaining").

In accordance with embodiments of the present disclosure, there is provided a programmable integrated circuit device having a first multiplication stage that computes a product of two data inputs, a second multiplication stage that processes that product to generate an output product, and a floating-point adder stage that computes a sum. The programmable integrated circuit device also includes configurable interconnect circuitry that (i) routes signals into and out of each of the first multiplication stage, the second multiplication stage, and the floating-point adder stage and (ii) selects either the output product generated by the second multiplication stage or a third data input as a selected adder input. In addition, a plurality of register banks are included in the programmable integrated circuit device that (i) pipelines the product computed by the first multiplication stage prior to providing the product to the second multiplication stage, (ii) pipelines a fourth data input, and (iii) provides the pipelined fourth data input in parallel with the selected adder input to the floating-point adder stage.

In accordance with additional embodiments of the present disclosure, the plurality of register banks includes first, second, and third register banks. The first register bank stores the product computed by the first multiplication stage and outputs that product to the second multiplication stage. The second register bank stores a fourth data input. The third register bank (i) stores the fourth data input provided by the second register bank and the selected adder input, and (ii) outputs, in parallel, the fourth data input and the selected adder input to the floating-point adder stage.

In accordance with additional embodiments of the present disclosure, the plurality of register banks also includes fourth and fifth register banks. The fourth register bank (i) stores the first, second, and third data inputs, (ii) outputs the first and second data inputs to the first multiplication stage, and (iii) outputs the third data input to the configurable interconnect circuitry. The fifth register bank stores the sum computed by the floating-point adder stage.

In accordance with additional embodiments of the present disclosure, the programmable integrated circuit device includes a logic gate that (i) receives signaling data from the second multiplication stage, the floating-point adder stage, and the fourth input data, (ii) performs a logical OR operation on the received signaling data, and (iii) outputs a result of the logical OR operation as a flag signal.

In accordance with some embodiments of the present disclosure, a programmable integrated circuit device is provided that includes a multiplication stage, a floating-point adder stage, and a logic block. The multiplication stage computes a product of two data inputs and outputs first signaling data. The floating-point adder stage computes a sum and outputs second signaling data. Finally, the logic block (i) receives the first signaling data, the second signaling data, and third signaling data from an adjacent digital signal processing block and (ii) generates a flag signal based on the first signaling data, the second signaling data, and the third signaling data.

Methods of configuring and operating the above-described programmable integrated circuit devices are also provided.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION OF THE INVENTION

In accordance with embodiments of the present disclosure, configurable specialized processing blocks, such as DSP blocks, are described herein that implement fixed and floating-point functionality in a single mixed architecture on a programmable device. The described architecture enables individual DSP blocks to be configured for fixed-point or floating-point operations, where both configurations use at least some of the same components and data paths of the DSP block. This reduces the need to construct floating-point functions outside the configurable specialized processing block and minimizes hardware cost and area. The disclosed architecture also introduces pipelining into the DSP block (at strategically placed locations) in order to ensure the floating-point multiplication and addition functions remain in synchronicity, thereby increasing the maximum frequency at which the DSP block can operate ($f_{MAX}$). Moreover, the disclosed architecture includes logic circuitry to support floating-point exception handling. Specifically, in accordance with some embodiments of the present disclosure, the DSP block can flag floating-point exceptions such as overflow, underflow, inexact, and invalid (e.g., NaN).

Fixed-point and floating-point multiplication may be performed using the same multiplier circuitry in the DSP block, e.g., by configuring the multiplier to perform 18×19 multiplication(s) or 27×27 multiplication, the latter configuration being sufficient to support floating-point multiplication. Floating-point addition, on the other hand, may be performed using a floating-point adder circuit incorporated into the DSP block. The floating-point adder circuit may be a wholly or partially dedicated (i.e., "hard logic") implementation of addition in accordance with the IEEE754-1985 standard, and can be used for addition operations, multiply-add (MADD) operations, or vector (dot product) operations, any of which can be either real or complex. The floating-point adder circuit can be independently accessed or used in combination with a multiplier in the DSP block, or even multipliers in adjacent DSP blocks (referred to herein as "chaining").

Figure 1:
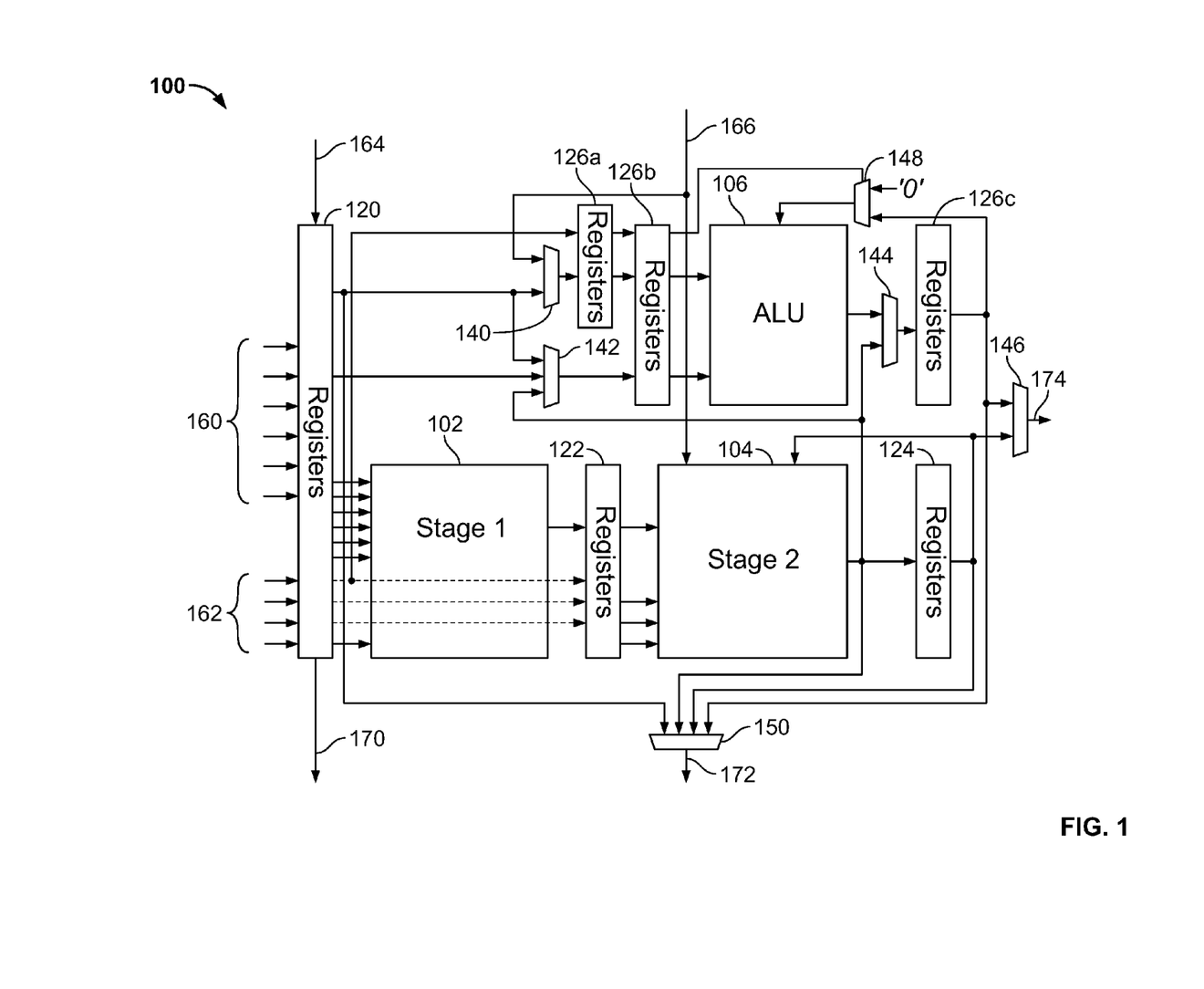
FIG. 1 is a block diagram of a digital signal processing (DSP) block, according to an illustrative embodiment.

FIG. 1 shows illustrative DSP block 100 that includes a number of register banks, processing stages, and multiplexers. Specifically, DSP block 100 includes input register bank 120, interstage register bank 122, output register bank 124, and floating-point register banks 126a-c. DSP block 100 also includes first and second multiplication stages 102 and 104, as well as floating-point arithmetic logic unit 106. Furthermore, DSP block 100 includes input multiplexers 140 and 142, stage selection multiplexer 144, output multiplexer 146, loopback multiplexer 148, and chain output multiplexer 150.

DSP block 100 combines fixed and floating-point multiplication in the same processing pipeline (i.e., the data path including multiplication stages 102 and 104 and register bank 122). This architecture reduces hardware redundancy by using many of the same components for fixed-point and floating-point arithmetic, while remaining backwards compatible with existing fixed-point processing units. Thus, floating-point functionality is provided with minimal impact to hardware area, no performance degradation, and backwards compatibility for all legacy fixed-point functions.

Input register bank 120 includes a set of registers necessary to store data inputs 160 and dynamic control inputs 162. In addition, input register bank 120 may include a number of delay registers. For example, input register bank 120 may include 152 registers: 110 registers to store data inputs, four registers to store dynamic control inputs, and 38 delay registers. Input register bank 120 may receive data inputs from a DSP routing unit and/or another DSP block (e.g., when multiple DSP blocks are cascaded together). Thus, in some embodiments, input register bank 120 includes an input cascade connection 164. When enabled, e.g., in "cascade mode," the input cascade connection receives an input to the multiplier from a previous DSP block. For example, the input cascade connection may receive up to 27 input bits to support either 18×19 or 27×27 multiplication. Control bits are provided to configure DSP block 100 to select data inputs from general DSP routing and/or from the input cascade connection. By the same token, input register bank 120 may include an output cascade connection 170, e.g., to provide input to a multiplier of a next DSP block in the cascade.

The delay registers of input register bank 120 are configured to delay (pipeline) data inputs by one or more clock cycles. For example, when performing 18×19 multiplication in cascade mode, the cascaded inputs may be delayed by an extra clock cycle.

The dynamic control inputs received by input register bank 120 enable a number of special features, including, for example, accumulation, decimation, preloading, zeroing, and double accumulation. The accumulate function adds the current result to the previous result of accumulation. The decimate function converts the current result into 2's compliment and adds it to the previous result. The preload function loads an initial value into the accumulator (e.g., a 64-bit value). The zeroing function disables all functionality of the accumulator. Finally, the double accumulation function maintains two accumulated values. The dynamic control inputs may also include a control to determine whether addition or subtraction should be performed. All of these features may be enabled, in some embodiments, using four dynamic control inputs.

Input register bank 120 selectively provides data inputs and dynamic control inputs to first multiplication stage 102. First multiplication stage 102 is capable of performing fixed-point or floating-point multiplication in combination with second multiplication stage 104. In particular, first multiplication stage 102 receives one or more input vectors and one or more multipliers, performs a summation and/or multiplication operation, and produces two vectors: "sum" and "carry." In some implementations, first multiplication stage 102 is configurable to implement two 18×19 multipliers or one 27×27 multiplier. The latter configuration is used to perform floating-point multiplication, which requires at least a 24×24 multiplier. The inputs to the one or more multipliers may be provided by any of a number of sources, including input register bank 120, one or more pre-adders included within first multiplication stage 102, or memory.

Figures 2A, 2B:
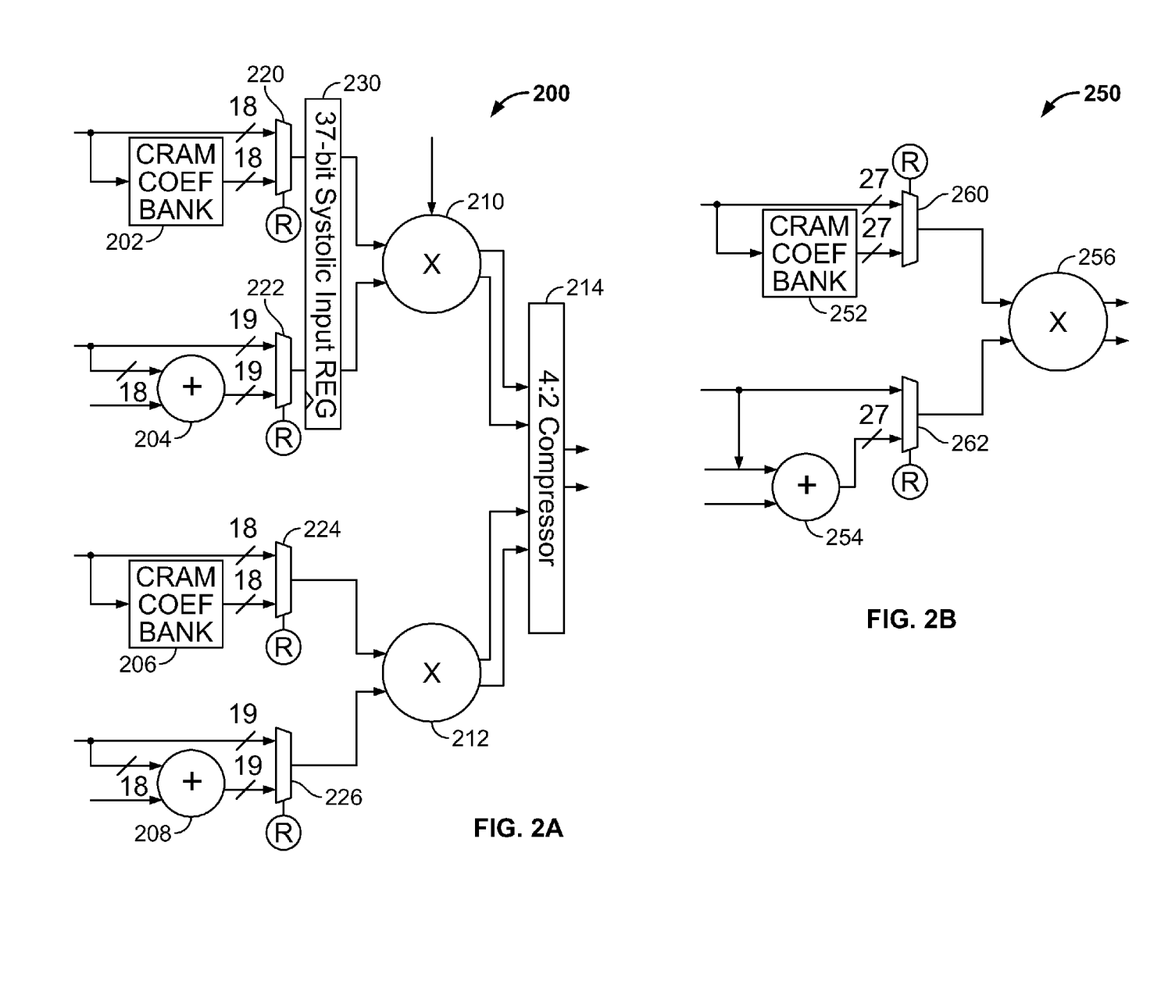
FIG. 2A is a block diagram of a first multiplication stage in the DSP block configured to perform two 18×19 multiplications, according to an illustrative embodiment.
FIG. 2B is a block diagram of a first multiplication stage in the DSP block configured to perform a 27×27 multiplication, according to an illustrative embodiment.

In some embodiments, first multiplication stage 102 may be implemented as shown in FIG. 2A. FIG. 2A is a block diagram of a first multiplication stage 200 configured to perform two 18×19 multiplications, according to an illustrative embodiment. First multiplication stage 200 includes pre-adders 204 and 208, multiplexers 220, 222, 224, and 226, multipliers 210 and 212, and a bypassable 4:2 compressor 214 (other components may be present but are omitted for the sake of simplicity). Optionally, first multiplication stage 200 may also include systolic input register 230, which may store up to 37 bits of data. Memory banks 202 and 206, which may store coefficients for use as multipliers, may be internal or external to first multiplication stage 200 (e.g., they may be memory spaces within a general random access memory accessible by the DSP block). It should be understood that memory banks 202 and 206 may also, in some embodiments, be the same memory bank or the same memory space in a general memory.

To perform two 18×19 multiplications, multiplexers 220, 222, 224, and 226 route two input signals to each of multipliers 210 and 212. Multiplexer 220 can be configured to provide multiplier 210 with an input signal (e.g., provided by input register bank 120 of FIG. 1) or a coefficient from memory bank 202. In the latter case, an input signal (e.g., provided by input register bank 120 of FIG. 1) may provide a memory address for retrieving the desired coefficient from memory bank 202. Multiplexer 222 can be configured to provide multiplier 210 with an input signal (e.g., provided by input register bank 120 of FIG. 1) or the sum of two input signals (e.g., provided by input register bank 120 of FIG. 1). In the latter scenario, pre-adder 204 receives and adds two input signals (e.g., provided by input register bank 120 of FIG. 1) and provides the sum to multiplexer 222. In some embodiments, the outputs of multiplexers 220 and 222 are first stored in systolic input register 230 prior to being provided to multiplier 210.

Meanwhile, multiplexers 224 and 226, memory bank 206, pre-adder 208, and multiplier 212 operate in a similar fashion to multiplexers 220 and 222, memory bank 202, pre-adder 204, and multiplier 210, respectively, albeit on different inputs. Specifically, multiplexer 224 can be configured to provide multiplier 212 with an input signal (e.g., provided by input register bank 120 of FIG. 1) or a coefficient from memory bank 206. In the latter case, an input signal (e.g., provided by input register bank 120 of FIG. 1) may provide a memory address for retrieving the desired coefficient from memory bank 206. Multiplexer 226 can be configured to provide multiplier 212 with an input signal (e.g., provided by input register bank 120 of FIG. 1) or the sum of two input signals (e.g., provided by input register bank 120 of FIG. 1). In the latter scenario, pre-adder 208 receives and adds two input signals (e.g., provided by input register bank 120 of FIG. 1) and provides the sum to multiplexer 226.

Finally, the outputs of multiplier 210 and 212, which each include separate "sum" and "carry" signals, may be compressed by an optional 4:2 compressor 214 (e.g., added or shifted and added to make a achieve a larger multiplier). The results of the two multiplications can also be overlapped by a multiplexer (not shown) so that they can be added together. When only a single 18×19 multiplication is performed, or when two separate products are calculated, the 4:2 compressor may be bypassed.

In other embodiments, first multiplication stage 102 of FIG. 1 may be implemented as shown in FIG. 2B. The arrangement of FIG. 2B may be used, for example, to implement floating-point multiplication functionality. FIG. 2B is a block diagram of a first multiplication stage 250 configured to perform a 27×27 multiplication, according to an illustrative embodiment. First multiplication stage 250 includes pre-adder 254, multiplexers 260 and 262, and multiplier 256 (other components may be present but are omitted for the sake of simplicity). Memory bank 252, which may store coefficients for use as multipliers, may be internal or external to first multiplication stage 250 (e.g., it may be a memory space within a general random access memory accessible by the DSP block).

It should be understood that pre-adder 254, multiplexers 260 and 262, multiplier 256, and memory bank 252 of FIG. 2B may be the same as, or implemented using, one or more of pre-adders 204 and 208, multiplexers 220, 222, 224, and 226, multipliers 210 and 212, and memory banks 202 and 208 of FIG. 2A, respectively. Specifically, pre-adders 204 and 208 can be configured as two independent adders, e.g., 19-bit adders to support 18×19 arithmetic functions, or as one 27-bit adder 254 to support 27×27 arithmetic functions.

To perform a 27×27 multiplication, which is sufficient for single-precision floating-point multiplication, multiplexers 260 and 262 route two input signals to multiplier 256. Multiplexer 260 can be configured to provide multiplier 256 with an input signal (e.g., provided by input register bank 120 of FIG. 1) or a coefficient from memory bank 252. In the latter case, an input signal (e.g., provided by input register bank 120 of FIG. 1) may provide a memory address for retrieving the desired coefficient from memory bank 252. Multiplexer 262 can be configured to provide multiplier 256 with an input signal (e.g., provided by input register bank 120 of FIG. 1) or the sum of two input signals (e.g., provided by input register bank 120 of FIG. 1). In the latter scenario, pre-adder 254 receives and adds two input signals (e.g., provided by input register bank 120 of FIG. 1) and provides the sum to multiplexer 262. The output of multiplier 256 is in redundant form, i.e., separate "sum" and "carry" vectors. The implementation details and functionality of first multiplication stage 102 of FIG. 1 are described further in U.S. patent application Ser. No. 12/380,853, filed Mar. 3, 2009, hereby incorporated by reference herein in its entirety.

Referring again to FIG. 1, the "sum" and "carry" vectors produced by first multiplication stage 102 are output to interstage register bank 122. Interstage register bank 122 introduces pipelining to ensure that the multiplication operations can be performed at maximum speed, thereby enabling DSP block 100 to operate at maximum frequency ($f_{MAX}$). In some implementations, interstage register bank 122 includes 151 bypassable registers: 148 registers to store data and three registers to store dynamic control signals. For proper systolic finite impulse response (FIR) support, the 148 data registers may be separated into two 74-register banks, where each data bank has its own clock source and bypass control. When first processing stage 102 is configured to implement two 18×19 multipliers (e.g., to sum the results of two 18×19 multiplications), the 148 registers may be divided into four groups of 37 registers each to store the 37-bit "sum" and "carry" vectors from each multiplier.

Interstage register bank 122 provides the stored data (i.e., "sum" and "carry" vectors) and dynamic control signals to second multiplication stage 104. Second multiplication stage 104 is the final multiplier stage and functions to generate a final output product from the "sum" and "carry" vectors provided by first multiplication stage 102. The output product is then routed from the output of second multiplication stage 104 to output register bank 124, register bank 126c (through multiplexer 144), and/or an adjacent DSP block (through multiplexer 150).

Figure 3:
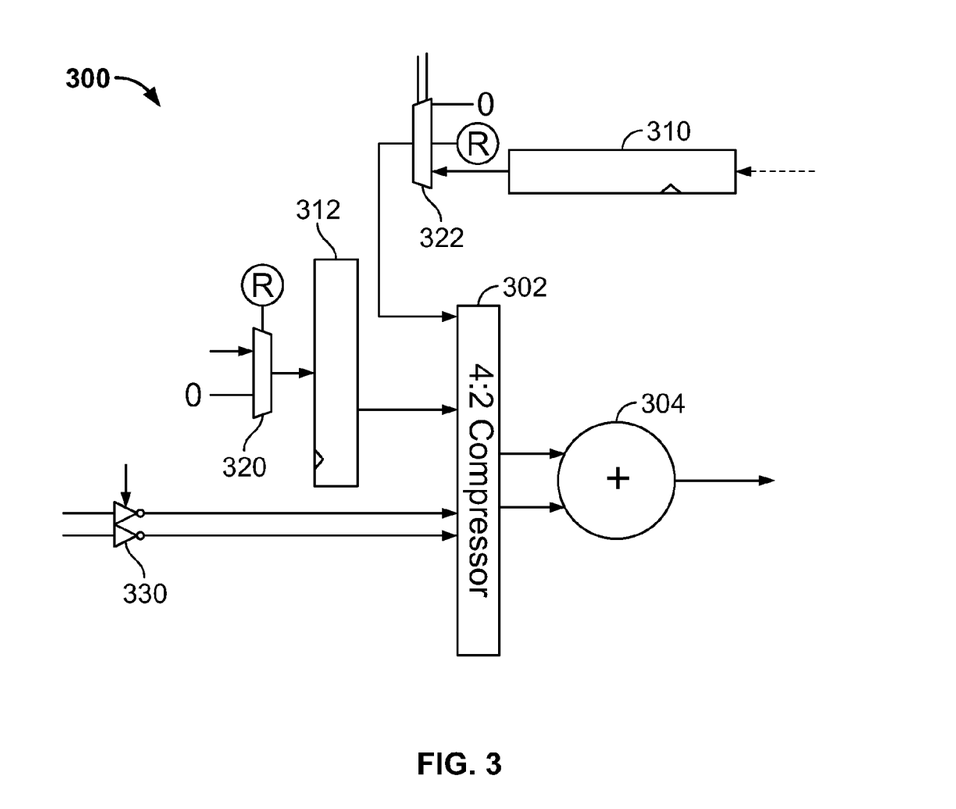
FIG. 3 is a block diagram of a second multiplication stage in the DSP block, according to an illustrative embodiment.

In some embodiments, second multiplication stage 104 of FIG. 1 may be implemented as shown in FIG. 3. FIG. 3 is a block diagram of second multiplication stage 300, according to an illustrative embodiment. Second multiplication stage 300 includes a 4:2 compressor 302 and a two-input carry propagate adder (CPA) 304. The 4:2 compressor 302 receives the "sum" and "carry" vectors provided by interstage register bank 122 of FIG. 1—and, optionally, fixed-point accumulator input and/or input from an adjacent DSP block—and outputs (compressed) "sum" and "carry" vectors to the CPA 304. The CPA adds the "sum" and "carry" vectors to produce the final output product of the multiplication operation. When only the "sum" and "carry" vectors provided by interstage register bank 122 of FIG. 1 are added, the 4:2 compressor 302 may be bypassed or, in an alternative embodiment, the 4:2 compressor 302 processes the "sum" and "carry" vectors provided by interstage register bank 122 with zero values applied to the other inputs.

More specifically, aside from compressor 302 and CPA 304, second multiplication stage 300 may include accumulation register 310, systolic output register 312, multiplexers 320 and 322, and inverters 330. Accumulation register 310 stores a previous fixed-point accumulation value (e.g., received from output register 124 of FIG. 1) and, in some modes, provides fixed-point accumulation input into 4:2 compressor 302 through multiplexer 322. Systolic output register 312 stores input provided by an adjacent DSP block and provides that input, in some modes, to 4:2 compressor 302 through multiplexer 312. Thus, 4:2 compressor receives an output of multiplexer 322, an output of register 312, and the "sum" and "carry" vectors from the first multiplication stage and provides "sum" and "carry" vectors to CPA 304.

In certain modes of operation, the "sum" and "carry" vectors output by the 4:2 compressor are the same as the "sum" and "carry" vectors provided by the first multiplication stage. In other modes of operation, the "sum" and "carry" vectors output by the 4:2 compressor are combinations of the "sum" and "carry" vectors provided by the first multiplication stage, the accumulation data stored in register 310, and/or the input data provided by the previous DSP block and stored in register 312. As noted above, moreover, 4:2 compressor 302 may be bypassed altogether and the "sum" and "carry" vectors provided by the first multiplication stage may be input directly into CPA 304. CPA 304 adds the "sum" and "carry" vectors to produce the final output product of the multiplication operation.

CPA 304 can be efficiently decomposed to support different adder combinations. For example, when first processing stage 102 of FIG. 1 is configured to implement two independent 18×19 multipliers, the CPA can be decomposed into two independent 37-bit adders. Alternatively, to support 27×27 multiplication or systolic fixed-point FIR filters, the same two adders can be combined to provide a single 74-bit adder (e.g., of which only the lower 64-bits are be used). Moreover, the same adder structure can support a single precision floating-point multiplier by configuring the CPA to perform mantissa multiplication, normalization, and rounding, all in a single step. Using second processing stage 104 to support single precision floating-point multiplication is described further in U.S. patent application Ser. No. 13/486,255, filed Jun. 1, 2012, hereby incorporated by reference herein in its entirety. In addition, techniques for implementing floating-point rounding are described further in U.S. patent application Ser. No. 13/934,421, filed Jul. 3, 2013, hereby incorporated by reference herein in its entirety.

Referring again to FIG. 1, output register bank 124 receives the output of second processing stage 104. In some implementations, output register bank 124 includes 74 bypassable registers. The entire bank may be controlled by one clock or bypassed using a single control bit. The output data stored in output register bank 124 may then be provided to output multiplexer 146, back to second processing stage 104, and/or to chain output multiplexer 150.

When using DSP block 100 to perform floating-point addition or subtraction operations, floating-point arithmetic logic unit 106 (ALU 106) is enabled. ALU 106 receives data inputs routed through one or more of floating-point register banks 126a-c. The data inputs may be provided by input register bank 120, an adjacent DSP block, second multiplication stage 104, and/or ALU 106 itself (i.e., output data from a previous arithmetic operation).

In some implementations, floating-point register bank 126a-c includes 146 bypassable registers divided into three groups, each with their own clock source and control. Register bank 126a is used to balance the pipeline stages (when necessary) and includes 37 registers: one 36-bit register bank for storing data and a 1-bit register for storing a dynamic control signal. Register bank 126b is used to provide two 36-bit data inputs to ALU 106 and includes 73 registers: two 36-bit register banks for the data inputs and a 1-bit register for storing a dynamic control signal. Register bank 126c is sued to store the result of the floating-point operation performed by ALU 106 and includes one 36-bit register bank.

Input multiplexers 140 and 142, stage selection multiplexer 144, output multiplexer 146, loopback multiplexer 148, and chain output multiplexer 150 are used to route the signals within DSP block 100 in accordance with a specific mode of operation. Specifically, DSP block 100 can be configured to operate in a number of different modes of operation in order to compute different functions. For example, DSP block 100 can be configured to calculate (i) two 18×19 multiplications, (ii) the sum of two 18×19 multiplications, (iii) the sum of a 36-bit input and an 18×19 multiplication, (iv) one 27×27 multiplication, (v) floating-point multiplication, (vi) floating-point addition/subtraction, (vii) floating-point multiplication with addition/subtraction, (viii) the sum of a floating-point multiplication product and an accumulated value, (ix) the sum of a floating-point multiplication product and a value provided by an adjacent DSP block, (x) a first floating-point vector (dot product) operation, and (xi) a second floating-point vector (dot product) operation. Furthermore, by forming a chain of DSP blocks, more complex calculations can be performed.

DSP block 100 is configurable to operate in fixed-point mode or floating-point mode. In fixed-point mode, the input data busses are 18-bits, while in floating-point mode, the 18-bit busses are combined to provide 32-bit input data busses. Similarly, in fixed-point mode, the busses used to communicate with adjacent DSP blocks are 64-bits while the output bus is 74-bits. An output bus of 74-bits is adequate to provide, for example, two 37-bit outputs (e.g., the results of two 18×19 fixed-point multiplications), one 27×27 fixed-point multiplication, or the sum of two 37-bit multiplications. When accumulation or output chaining is enabled, the output bus can provide up to 64 bits. In floating-point mode, on the other hand, the busses for communicating with adjacent DSP blocks and the output busses are all 36 bits: 32 bits for the floating point number and four bits for signaling. The signaling bits are used to forward exceptions during vector modes, and are explained in detail below.

As noted above, the presence of interstage register 122 in the multiplier flow introduces pipelining to increase the maximum frequency at which DSP block 100 can reliably operate ($f_{MAX}$). When configured for floating-point mode, floating-point register bank 126a is used to balance the effects of interstage register 122. Floating-point register bank 126a is designed to balance all floating-point modes, such as multiply-add and all of the vector modes.

Figure 4:
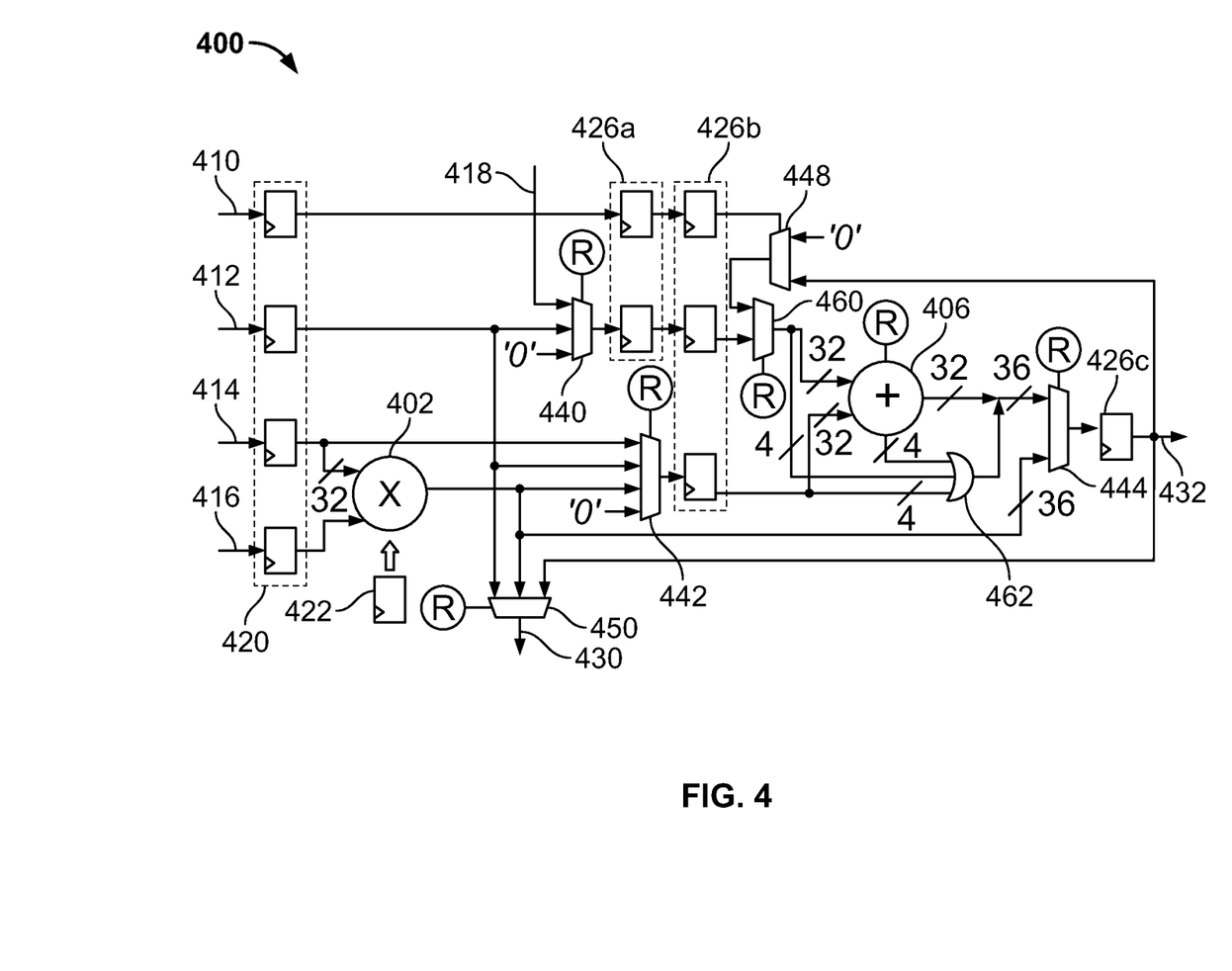
FIG. 4 is a simplified block diagram of a DSP block configured to perform floating-point operations, according to an illustrative embodiment.

FIG. 4 shows illustrative DSP block 400, which is a simplified block diagram of DSP block 100 of FIG. 1 when DSP block 100 is configured to perform floating-point operations. In addition, FIG. 2 shows signaling components (omitted from FIG. 1) that are used during floating-point operations. In particular, DSP block 400 includes input register bank 420 (corresponding to input register bank 120 of FIG. 1), interstage register bank 422 (corresponding to interstage register bank 122 of FIG. 1), and floating-point register banks 426a-c (corresponding to floating-point register banks 126a-c of FIG. 1). DSP block 400 also includes multiplier 402 (corresponding to the combination of first and second processing stages 102 and 104 of FIG. 1, e.g., the combination of the multiplication stages depicted in FIG. 2B and FIG. 3), as well as floating-point ALU 406 (corresponding to ALU 106 of FIG. 1).

Furthermore, DSP block 400 includes input multiplexers 440 and 442 (corresponding to multiplexers 140 and 142 of FIG. 1, respectively), stage selection multiplexer 444 (corresponding to multiplexer 144 of FIG. 1), loopback multiplexer 448 (corresponding to multiplexer 148 of FIG. 1), chain output multiplexer 450 (corresponding to multiplexer 150 of FIG. 1), and ALU input register 460 (not shown in FIG. 1). Output register bank 424, output multiplexer 446, and the cascade connections of FIG. 1 are not used in the floating-point modes and are consequently omitted for the sake of simplicity. Finally, DSP block 400 includes logic element 462 (not shown in FIG. 1), which may be an OR gate, to provide proper exception signaling.

Figure 5:
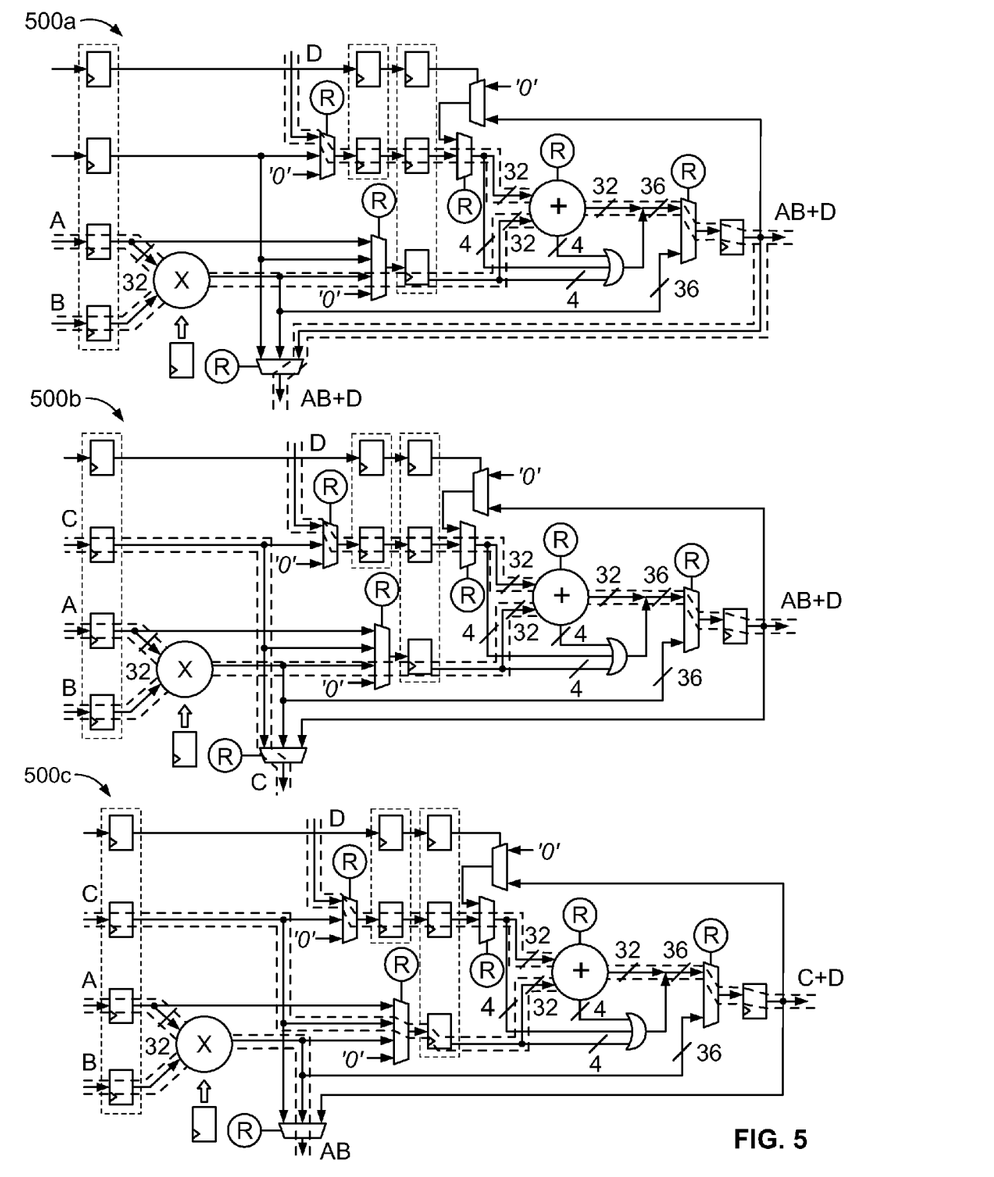
FIG. 5 shows signal flows for three exemplary floating-point modes of the DSP block, according to an illustrative embodiment.

DSP block 400 operates in a number of different vector modes depending on the desired function. In a first vector mode, two inputs (A, B) received from DSP routing circuitry are multiplied and the resulting product is added to an input (D) received from an adjacent DSP block to produce a sum (AB+D). The sum (AB+D) is routed to both an output of the DSP block and an input of an adjacent DSP block. In a second vector mode, two inputs (A, B) received from DSP routing circuitry are multiplied and the resulting product is added to an input (D) received from an adjacent DSP block to produce a sum (AB+D). The sum (AB+D) is routed to an output of the DSP block, while a third input (C) received from DSP routing circuitry is routed to an input of an adjacent DSP block. In a third mode, two inputs (A, B) received from DSP routing circuitry are multiplied and the resulting product is routed to an input of an adjacent DSP block. At the same time, a third input (C) received from DSP routing circuitry is added to an input (D) received from an adjacent DSP block to produce a sum (C+D). The sum (C+D) is routed to an output of the DSP block. The signal flows of the floating-point data in each of these three modes are illustrated in FIG. 5. A fourth mode (not illustrated) is also supported wherein two inputs (A, B) received from DSP routing circuitry are multiplied and the resulting product is added to a third input (C) received from DSP routing circuitry to produce a sum (AB+C). The sum (AB+C) is routed to an output of the DSP block.

The signal flows of three data inputs (A, B and D) when the DSP block is configured to operate in the first mode are shown in flow diagram 500a. Two data inputs (A, B) are routed from input registers to a multiplier, where their product (AB) is computed. As noted above, the product (AB) is also pipelined for a clock cycle between the two stages of the multiplier. The product (AB) is routed from the multiplier to a register bank, where it is stored for another clock cycle, and then routed to a floating-point adder. In parallel, a data input (D) from an adjacent DSP block is pipelined twice using two register banks and then routed to the floating-point adder. Thus, both the product (AB) and the data input (D), having each been pipelined for two clock cycles, arrive at the adder during the same clock cycle. The adder computes the sum of its two inputs (AB+D) and the sum is routed to and stored in an output register. On the next clock cycle, the sum (AB+D) is provided by the output register to the output of the DSP block and routed to an adjacent DSP block.

The signal flows of four data inputs (A, B, C, and D) when the DSP block is configured to operate in the second mode are shown in flow diagram 500b. Two data inputs (A, B) are routed from input registers to a multiplier, where their product (AB) is computed. As noted above, the product (AB) is also pipelined for a clock cycle between the two stages of the multiplier. The product (AB) is routed from the multiplier to a register bank, where it is stored for another clock cycle, and then routed to a floating-point adder. In parallel, a data input (D) from an adjacent DSP block is pipelined twice using two register banks and then routed to the floating-point adder. Thus, both the product (AB) and the data input (D), having each been pipelined for two clock cycles, arrive at the adder during the same clock cycle. The adder computes the sum of its two inputs (AB+D) and the sum is routed to and stored in an output register. On the next clock cycle, the sum (AB+D) is provided by the output register to the output of the DSP block. At the same time the floating-point multiplication and addition is being performed, a third data input (C) is routed from the input registers to an adjacent DSP block.

The signal flows of four data inputs (A, B, C, and D) when the DSP block is configured to operate in the third mode are shown in flow diagram 500c. Two data inputs (A, B) are routed from input registers to a multiplier, where their product (AB) is computed. As noted above, the product (AB) is also pipelined for a clock cycle between the two stages of the multiplier. The product (AB) is routed from the multiplier to an adjacent DSP block. In parallel, a third data input (C) is routed from the input registers to a register bank, where it is pipelined for a clock cycle and then routed to a floating-point adder. At the same time, a data input (D) from an adjacent DSP block is pipelined for a clock cycle and then routed to the floating-point adder. Although the data input (D) from the adjacent DSP block is depicted as passing through two register banks, the first register bank is bypassable in some implementations, and so the data input may be pipelined for only a single clock cycle. Thus, both the third data input (C) the data input (D) from the adjacent DSP block, having each been pipelined for a clock cycle, arrive at the adder during the same clock cycle. The adder computes the sum of its two inputs (C+D) and the sum is routed to and stored in an output register. On the next clock cycle, the sum (C+D) is provided by the output register to the output of the DSP block.

In some embodiments, each of the data inputs provided by the input registers (A, B, C) are 32 bit values. On the other hand, the outputs of the multiplier and adder as well as the input (D) from the adjacent DSP block are 36 bits, 4 bits being dedicated to floating-point exception handling. The signal flows of the floating-point exception handling (e.g., in each of the three modes described above) are illustrated in FIG. 6.

Figure 6:
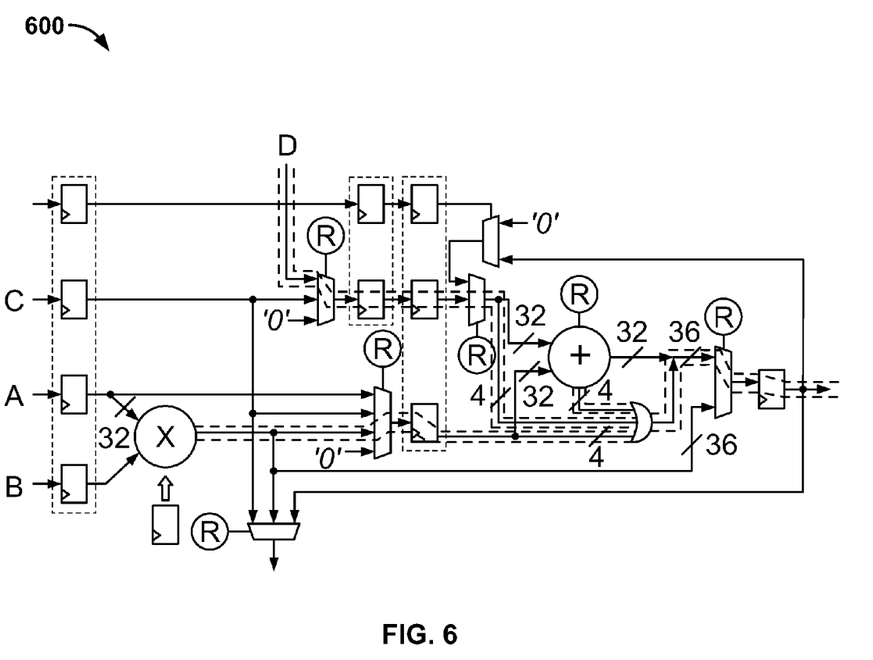
FIG. 6 shows signal flows for exception handling when the DSP block is configured to perform floating-point operations, according to an illustrative embodiment.

As shown in FIG. 6, the floating-point exception flags (e.g., represented by a 4-bit value) are provided with input data (D) from the adjacent DSP block. The signaling is routed through the same path as the input data (D) itself until just prior to the adder, when it is instead routed to the logic block (e.g., OR gate). At the same time, exception flags generated by each of the multiplier and adder are routed to the logic block. The logic block combines the three sets of exception flags and the result is re-combined with the output of the adder (e.g., into a 36-bit output) and subsequently routed to the output register. Exceptions that can be flagged by the disclosed architecture include overflow, underflow, inexact, and invalid.

Figure 7:
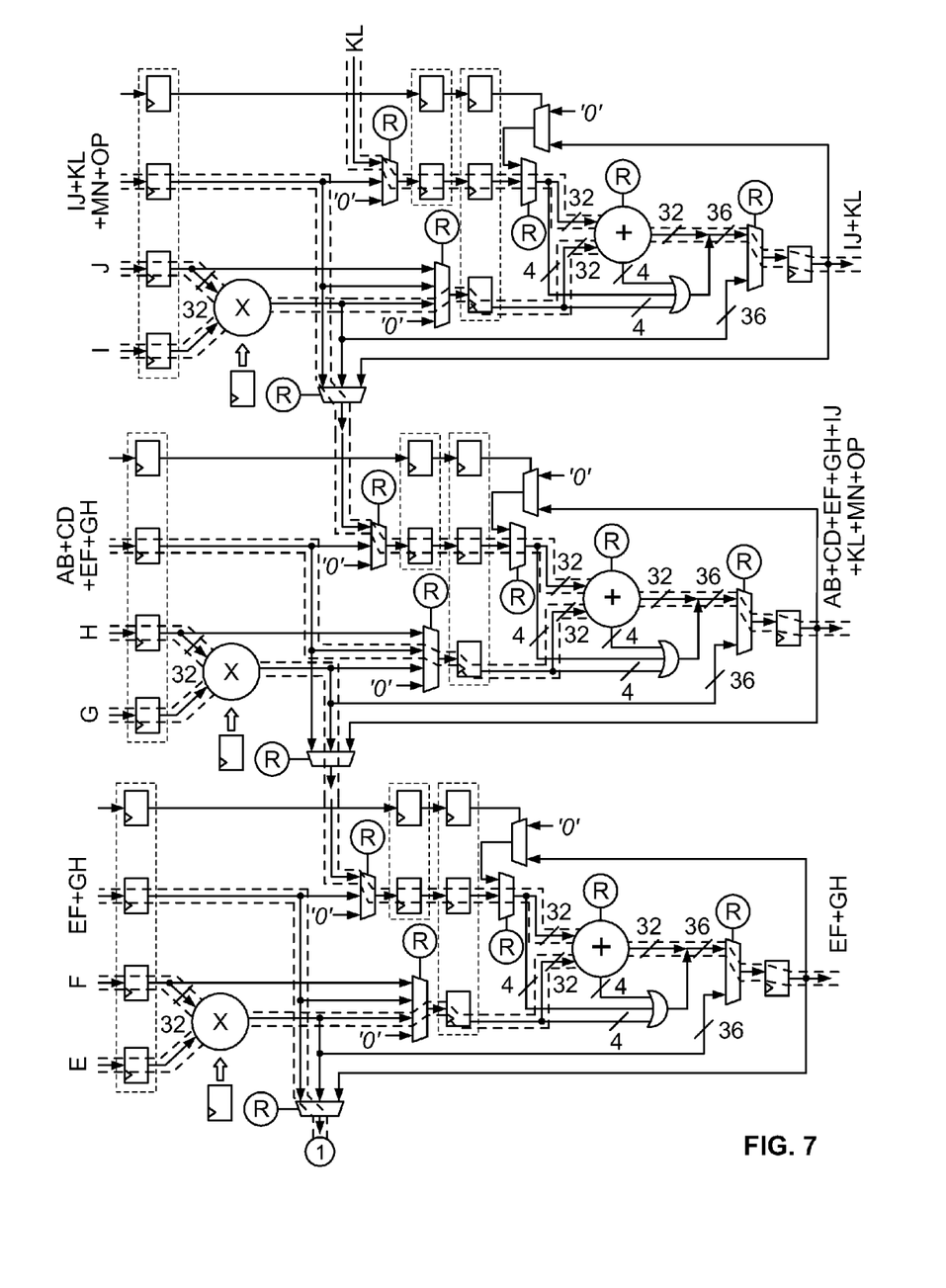
FIG. 7 is a simplified block diagram of five chained DSP blocks configured to perform vector (e.g., dot product) operations in a first illustrative vector mode and shows the data flow of the various inputs and outputs to the DSP blocks, according to an illustrative embodiment.
Figure 8:
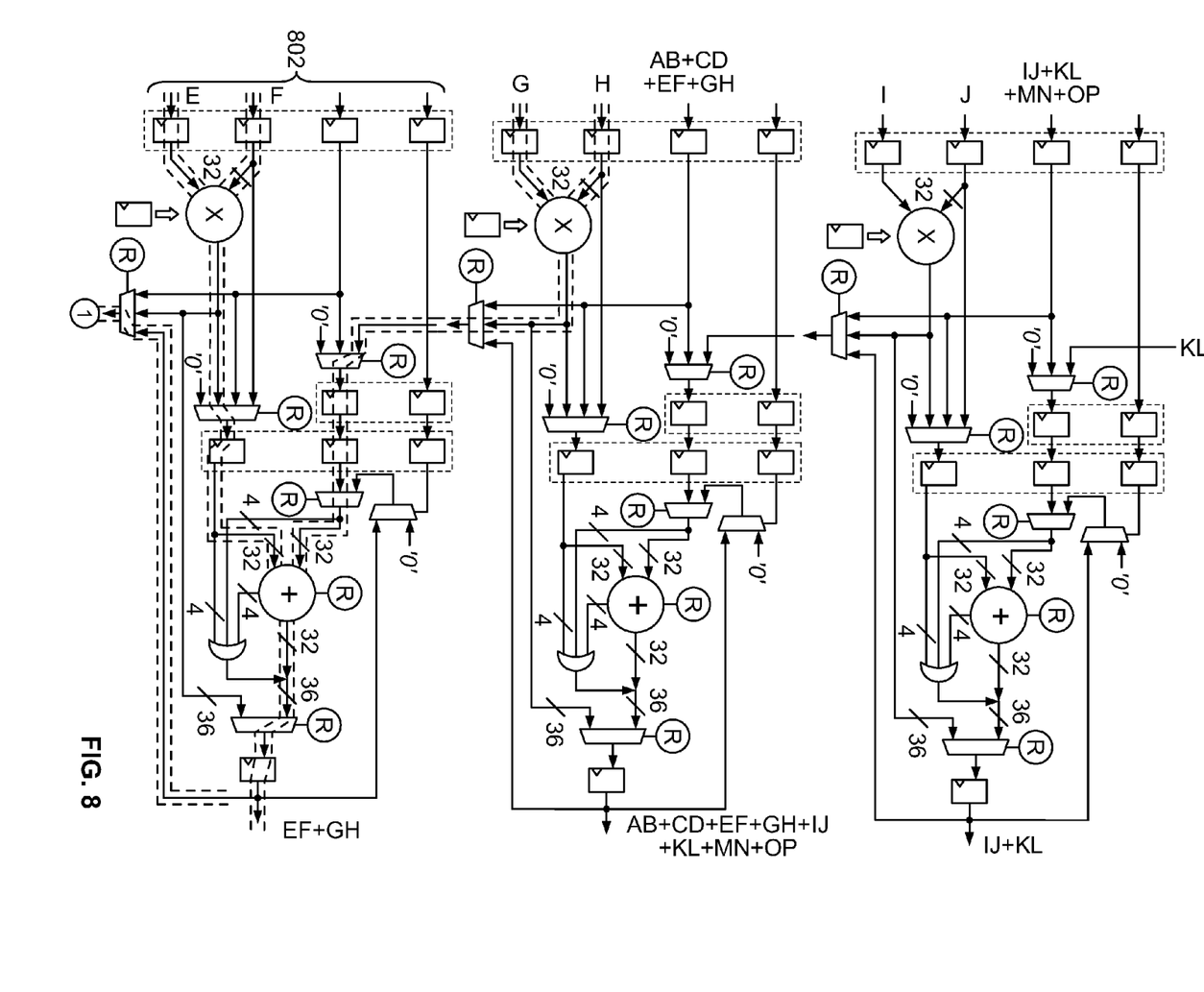
FIG. 8 is a simplified block diagram of five chained DSP blocks configured to perform vector (e.g., dot product) operations in a second illustrative vector mode and shows the data flow of the various inputs and outputs to the DSP blocks, according to an illustrative embodiment.

Exemplary vector (dot product) operations are depicted in FIGS. 7 and 8. FIG. 7 shows the signal flow in an exemplary embodiment of five adjacent DSP blocks configured to perform vector reduction. Each of the DSP blocks is configured to operate in one of the three modes described above. The logical connections for the different vector modes are as described above and further in U.S. patent application Ser. No. 13/752,661, filed Jan. 29, 2013, hereby incorporated by reference herein in its entirety. In addition, various types of recursive topologies that may be implemented by these blocks are described in U.S. patent application Ser. No. 13/941,847, filed Jul. 15, 2013, hereby incorporated by reference herein in its entirety. FIG. 8 differs from FIG. 7 only in the configuration of DSP block 802, which is configured in the first mode rather than the second mode described above.

The above described embodiments of the present disclosure are presented for purposes of illustration and not of limitation, and the present disclosure is limited only by the claims which follow.

What is claimed is:

1. A programmable integrated circuit device comprising:
   a multiplication stage that computes a product of a first data input and a second data input;
   a floating-point adder stage that computes a sum;
   a logic block that generates a flag signal;
   configurable interconnect circuitry that (i) routes signals into and out of each of the multiplication stage and the floating-point adder stage and (ii) selects one of the product generated by the multiplication stage and a third data input as a selected adder input; and
   a plurality of register banks that (i) pipelines a fourth data input, and (ii) provides the pipelined fourth data input in parallel with the selected adder input to the floating-point adder stage and to the logic block.

2. The programmable integrated circuit device of claim 1, wherein the multiplication stage comprises:
   a first multiplication stage; and
   a second multiplication stage; and
   wherein the plurality of register banks pipelines output of the first multiplication stage prior to providing the pipelined output to the second multiplication stage.

3. The programmable integrated circuit device of claim 2, wherein the plurality of register banks comprises:
   a first register bank that stores the output of the first multiplication stage and provides the output of the first multiplication stage to the second multiplication stage;
   a second register bank that stores the fourth data input;
   a third register bank that (i) stores the fourth data input provided by the second register bank and the selected adder input, and (ii) outputs, in parallel, the fourth data input and the selected adder input to the floating-point adder stage;
   a fourth register bank that (i) stores the first data input, the second data input, and the third data input, (ii) outputs the first data input and the second data input to the first multiplication stage, and (iii) outputs the third data input to the configurable interconnect circuitry; and
   a fifth register bank that stores the sum computed by the floating-point adder stage.

4. The programmable integrated circuit device of claim 3, wherein the configurable interconnect circuitry comprises:
   a first multiplexer that (i) receives the third data input from the fourth register bank and the fourth data input and (ii) outputs a selected one of the third data input and the fourth data input to the second register bank based on a first control signal;
   a second multiplexer that (i) receives the first data input from the fourth register bank, the third data input from the fourth register bank, and an output product from the second multiplication stage, and (ii) outputs a selected one of the first data input, the third data input, and the output product to the third register bank based on a second control signal; and
   a third multiplexer that (i) receives the third data input from the fourth register bank, the output product from the second multiplication stage, and the sum stored in the fifth register bank and (ii) outputs a selected one of the third data input, the output product, and the sum based on a third control signal.

5. The programmable integrated circuit device of claim 4 further comprising:
   a fourth multiplexer that (i) receives the fourth data input stored in the third register bank and the sum stored in the fifth register bank and (ii) outputs a selected one of the fourth data input and the sum to the floating-point adder stage based on a fourth control signal; and a fifth multiplexer that (i) receives the output product from the second multiplication stage and the sum computed by the floating-point adder stage and (ii) outputs a selected one of the output product and the sum to the fifth register bank based on a fifth control signal.

6. The programmable integrated circuit device of claim 4, wherein:
the first multiplication stage receives the first data input and the second data input and computes the product as a sum vector and a carry vector; and
the second multiplication stage receives and combines the sum vector and the carry vector to generate the output product.

7. The programmable integrated circuit device of claim 1, wherein the multiplication stage is operable to perform fixed-point multiplication and floating-point multiplication.

8. A programmable integrated circuit device comprising:
a multiplication stage that computes a product of a first data input and a second data input and outputs first signaling data;
a floating-point adder stage that computes a sum and outputs second signaling data;
a logic block that (i) receives the first signaling data, the second signaling data, and third signaling data from a digital signal processing block and (ii) generates a flag signal based on the first signaling data, the second signaling data, and the third signaling data; and
configurable interconnect circuitry that (i) routes signals into and out of each of the multiplication stage and the floating-point adder stage, (ii) selects a first operand of the floating-point adder stage among the first data input, the product computed by the multiplication stage, and a third data input, and (iii) selects a second operand of the floating-point adder stage among the third data input and a fourth data input from the digital signal processing block.

9. The programmable integrated circuit device of claim 8, wherein the configurable interconnect circuitry further:
routes the first signaling data from the multiplication stage to the logic block;
routes the second signaling data from the floating-point adder stage to the logic block; and
routes the third signaling data from the digital signal processing block to the logic block.

10. The programmable integrated circuit device of claim 9, wherein the multiplication stage comprises a first multiplication stage and a second multiplication stage, the programmable integrated circuit device further comprising:
a plurality of register banks that (i) pipelines output of the first multiplication stage prior to providing the output to the second multiplication stage, and (ii) pipelines the third signaling data from the digital signal processing block prior to providing the third signaling data to the logic block.

11. The programmable integrated circuit device of claim 10, wherein the plurality of register banks further (i) pipelines the first signaling data from the multiplication stage prior to providing the first signaling data to the logic block, and (ii) twice pipelines the third signaling data from the digital signal processing block prior to providing the third signaling data to the logic block.

12. The programmable integrated circuit device of claim 8, wherein the first signaling data, the second signaling data, the third signaling data, and the flag signal are each 4-bits.

13. A method for configuring a programmable integrated circuit device for floating-point arithmetic operations, wherein the programmable integrated circuit device comprises a multiplication stage, a floating-point adder stage, a logic block, configurable interconnect circuitry, and a plurality of register banks, the method comprising:
computing, with the multiplication stage, a product of first and second data inputs;
generating a flag signal with the logic block;
pipelining, with a first of the plurality of register banks, at least one of a third data input and a fourth data input; and
configuring the configurable interconnect circuitry to select first and second signals from among (i) the product computed by the multiplication stage, (ii) the pipelined third data input, and (iii) the pipelined fourth data input, wherein a respective first portion of the first and second signals is provided as first and second adder inputs to the floating-point adder stage and a respective second portion of the first and second signals that is different than the first and second adder inputs is provided as first and second signaling data to the logic block.

14. The method of claim 13, wherein the multiplication stage comprises first and second multiplication stages, the method further comprising:
pipelining, with a second of the plurality of register banks, an output of the first multiplication stage; and
providing the pipelined output to the second multiplication stage.

15. The method of claim 14 further comprising:
configuring the configurable interconnect circuitry to route the fourth data input from a first digital signal processing block to the second of the plurality of register banks;
pipelining, with the first of the plurality of register banks, the fourth data input;
configuring the configurable interconnect circuitry to route the product computed by the multiplication stage as the first adder input and the pipelined fourth data input as the second adder input to the floating-point adder stage; and
computing, with the floating-point adder stage, a sum of the product computed by the multiplication stage and the pipelined fourth data input.

16. The method of claim 15 further comprising:
configuring the configurable interconnect circuitry to route the sum from the floating-point adder stage to a second digital signal processing block.

17. The method of claim 15 further comprising:
configuring the configurable interconnect circuitry to route the third data input from a third of the plurality of register banks to a second digital signal processing block.

18. The method of claim 13 further comprising:
configuring the configurable interconnect circuitry to route the fourth data input from a first digital signal processing block as the second adder input to the floating-point adder stage;
configuring the configurable interconnect circuitry to route the third data input from a second of the plurality of register banks as the first adder input to the floating-point adder stage; and
computing, with the floating-point adder stage, a sum of the third and fourth data inputs.

19. The method of claim 18 further comprising:
configuring the configurable interconnect circuitry to route the product computed by the multiplication stage to a second digital signal processing block.

20. The method of claim 13 further comprising:
configuring the configurable interconnect circuitry to route third signaling data from the floating-point adder stage to the logic block;
generating, with the logic block, the flag signal based on the first signaling data, the second signaling data, and the third signaling data.

21. The method of claim 20, wherein generating the flag signal comprises combining the first signaling data, the second signaling data and the third signaling data using a logical OR operation.

\* \* \* \* \*